United States Patent [19]

Lee

[11] 4,087,800

[45] May 2, 1978

[54] CONVEYOR BELT MONITORING SYSTEM

[75] Inventor: Maw-Huei Lee, Brecksville, Ohio

[73] Assignee: The B. F. Goodrich Company, Akron, Ohio

[21] Appl. No.: 736,792

[22] Filed: Oct. 29, 1976

[51] Int. Cl.² .................................... G08B 21/00
[52] U.S. Cl. ........................... 340/259; 198/502; 331/65
[58] Field of Search ............... 340/259, 258 C, 58; 200/61.22; 198/502, 505; 331/64, 65

[56] References Cited

U.S. PATENT DOCUMENTS

| | | | |
|---|---|---|---|
| 3,602,884 | 8/1971 | Brumbelow | 340/58 |
| 3,651,506 | 3/1972 | Olaf et al. | 340/259 |
| 3,656,137 | 4/1972 | Ratz | 340/259 |
| 3,742,477 | 6/1973 | Enabnit | 340/259 |

Primary Examiner—John W. Caldwell, Sr.
Assistant Examiner—Joseph E. Nowicki

[57] ABSTRACT

A monitoring system for detecting a longitudinal rip in a conveyor belt senses the presence of the rip and simultaneously produces a warning signal and stops the operation of the conveyor system. The system includes a series of sensor circuits embedded in the conveyor belt in spaced relationship along the length of the belt and a series of alarm circuits positioned at intervals along the upper run of the conveyor belt but out of actual contact with the conveyor belt. Each sensor unit embedded in the conveyor belt consists of a loop of conductive wire or ribbon positioned transversely across substantially the width of the conveyor belt and a coil wound on a powder core with its terminals in electrical connection with the ends of the loop of conductive wire or ribbon. When the conveyor belt is free of longitudinal rips, the sensor circuit as it passes in close proximity to the alarm circuit has no noticeable effect on the alarm circuit. However, when a longitudinal rip develops in the conveyor belt and parts the loop of wire in one of the sensor circuits thereby breaking the electrical circuit of that sensor circuit, the effected sensor circuit as it passes in close proximity to an alarm circuit causes the triggering of the alarm circuit that sets off a warning alarm and stops the operation of the conveyor system.

4 Claims, 6 Drawing Figures

CONVEYOR BELT MONITORING SYSTEM

BACKGROUND OF THE INVENTION

The present invention relates to a monitoring system for detecting a longitudinal (lengthwise) rip in a conveyor belt before the rip reaches a size sufficient to cause excessive or irreparable damage to the conveyor belt or to the conveyor drive system. In large endless conveyor belt systems that are used for transporting bulk materials such as coal, mineral rock and ores over long distances, it is not uncommon for sharp or jagged pieces of the conveyed material as they are dropped onto the conveyor belt to penetrate into the conveyor belt. With continued use of the conveyor belt, the damaged area often can develop into a rip that progressively increases in length longitudinally along the belt until the rip has grown in size sufficient to require the replacement of a large segment of the belt or, sometimes, the replacement of the entire belt. Additionally, if the rip becomes too extensive, the conveyor belt itself may pull apart and become jammed in the drive mechanism of the conveyor system. Accordingly, it has long been recognized that a monitoring system for early detection of longitudinal rips in conveyor belts is desirable.

A number of such monitoring systems have been proposed, but generally the systems are expensive and quite complex in their circuitry thereby increasing the number of potential sources for component failure. Examples of three monitoring systems which previously have been proposed are described in U.S. Pat. Nos. 3,651,506; 3,656,137 and 3,792,459.

The monitoring system described in U.S. Pat. No. 3,651,506 utilizes closed loops of conductive wire embedded in the belt at spaced intervals along the length of the conveyor belt. At selected locations along the path of advance of the belt are positioned a frequency transmitter and a receiver, the transmitter being positioned at one side of the belt with the receiver positioned at the other side of the belt opposite the transmitter. As long as the loops of wire embedded in the belt are not broken, a signal emitted by the transmitter is electromagnetically transmitted by the closed wire loop to the receiver which emits an output signal to an analyzing circuit. The regularly timed pulsing signals from the receiver to the analyzing circuit prevents the triggering of the alarm circuit and the shut-down of the conveyor system. However, if a longitudinal rip develops in the conveyor belt and one of the wire loops becomes broken, no output signal is emitted from the receiver as the broken loop passes between the transmitter and receiver. The interruption to the regular pattern of pulsing signals from the receiver to the analyzing circuit causes the triggering of the alarm circuit and the shut-down of the belt drive mechanism.

U.S. Pat. No. 3,792,459 describes a monitoring system which includes a number of single wire conductors embedded in the belt at spaced intervals along the length of the belt. The conductors extend transversely across substantially the entire width of the belt. As the belt advances the conductors pass over a signal transmitter plate positioned beneath one edge of the belt and a detector plate positioned beneath the opposite edge of the belt. When an unbroken conductor passes over the signal transmitter plate an electrical signal is capacitively induced in the conductor which caues a signal to be capacitively induced at the detector plate. However, when the conductor is broken (for example, by the occurrence of a longitudinal rip in the belt), there will not be a signal inductively produced at the detector plate and an interruption to the regular pulsating pattern of signals emitted by the detector plate will occur causing the triggering of the alarm circuitry and a shut-down of the system.

In U.S. Pat. No. 3,656,137, a monitoring system is described that utilizes a series of spaced conductive wire loops which extend transversely across substantially the entire width of th conveyor belt. Each wire loop is in electrical connection with a turned circuit consisting of a capacitor in parallel electrical connection with an inductance coil. The wire loop serves to "short circuit" the tuned circuit with which it is associated as long as the wire loop remains unbroken. A stationary tuned circuit monitor unit is positioned at the side of the conveyor belt. As the belt is advanced, the wire loops embedded in the belt are caused to pass by the stationary tuned circuit monitor unit. As long as the wire loops remain unbroken, their passage by the monitor unit causes an insufficient effect on the monitoring unit to trigger the alarm circuitry. However, if a rip develops in the belt and breaks a wire loop, the tuned circuit formed by the inductance coil and capacitor with which the wire loop is associated no longer is "short circuited" and as it passes the monitor unit electromagnetically couples with the tuned circuit of the monitor unit resulting in a reduction in the amplitude of the output of the monitor unit which, in turn, triggers the alarm circuit. Although the monitoring system described in U.S. Pat. No. 3,656,137 is not subject to many of the deficiencies inherent in other systems preciously proposed, the use of a capacitor in the wire loop circuits embedded in the belt creates a source of possible malfunction in the system since the capacitors are likely to be damaged and rendered non-functional by the dumping of bulk material onto the belt.

SUMMARY OF THE INVENTION

The present invention provides a reliable monitoring system for detecting a longitudinal rip in a conveyor belt before it has progressed in size sufficiently to require the replacement of an unduly large segment of the belt. The system includes a series of sensor circuits embedded in the conveyor belt at spaced intervals along the length of the belt and a series of alarm circuits positioned at intervals along the length of the conveyor belt in close proximity to but spaced from the conveyor belt. Each of the sensor circuits embedded in the conveyor belt consists of a loop of conductive wire (either of round or flattened cross-section) extending transversely across substantially the width of the conveyor belt and an inductor coil wound on a powder core with the terminals of the inductor coil in electrical connection with the ends of the loop of conductive wire. The alarm circuit includes an inductor coil wound on a powder core and a capacitor that are in a circuit that is tuned to electrical resonance at the frequency of a signal generated within the alarm circuit. The number of turns of wire in the inductor coil of each sensor circuit are chosen so that the inductor coil of the sensor cicuit is in electrical resonance with the distributed capacitance of the inductor coil at the frequency of the signal generated within the alarm circuit whenever the loop of wire in the sensor circuit is broken. As the conveyor belt is advanced the inductor coil of the sensor circuit passes in close proximity to the inductor coil of the alarm circuit.

As long as the loop of wire of the sensor circuit remains unbroken, the passage of the inductor coil of the sensor circuit in close proximity to the inductor coil of the alarm circuit has insufficient effect on the voltage amplitude across the inductor coil of the alarm circuit to cause the triggering of the alarm circuit. However, if a longitudinal rip in the conveyor belt develops and becomes of sufficient length to cause the breaking of the loop of wire of one of the sensor circuits embedded in the conveyor belt, the passage of the inductor coil of the affected sensor circuit in close proximity to the inductor coil of the alarm circuit will cause a sufficient drop in the amplitude of the voltage across the inductor coil of the alarm circuit to trigger the alarm circuit. The triggering of the alarm circuit sets off a warning signal or stops the operation of the conveyor system or both. The warning signal may be a visual signal or an audible signal or may consist of both audible and visual signals.

The invention will be more fully understood by reference to the following description of a preferred embodiment of the invention when read in connection with the accompanying drawings.

DETAILED DESCRIPTION OF THE INVENTION

Figure 1:
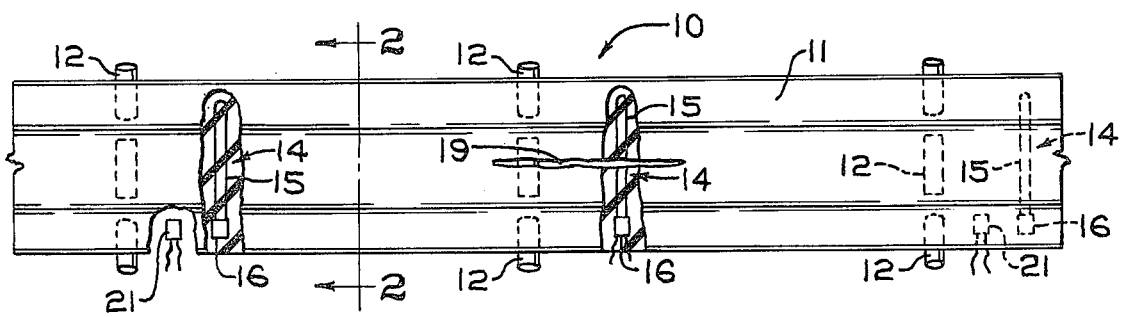
FIG. 1 is a schematic plan view, partly broken away, of a portion of a conveyor belt traveling over support rollers and illustrates a series of sensor circuits embedded at spaced intervals along the conveyor belt and the inductor coils of two alarm circuits positioned at intervals along the path of advance of the conveyor belt and located so that the inductor coils of the sensor circuits will pass in close proximity to the inductor coils of the sensor circuits.
Figure 2:
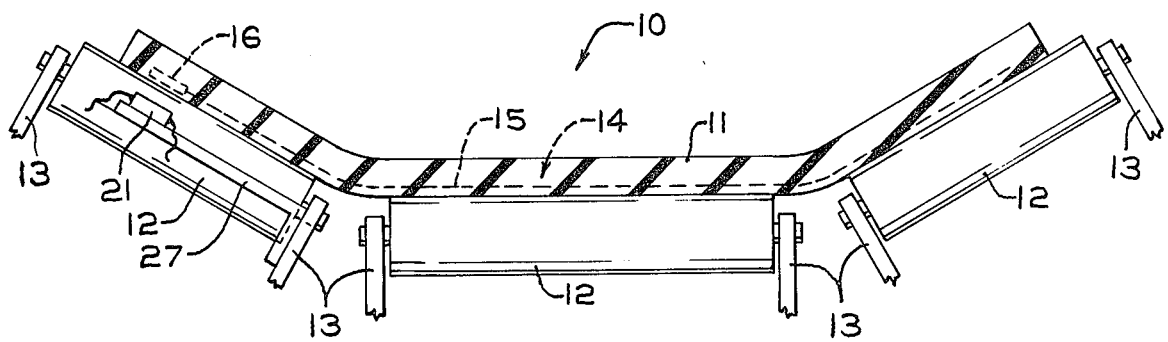
FIG. 2 is a section view of the conveyor installation of FIG. 1 taken along line 2—2 of FIG. 1.

Referring to the drawings, the conveyor system 10 includes an endless non-metallic flexible conveyor belt 11 disposed around conventional drive and idler rolls (not shown) and supported by rollers 12,12 mounted for rotation in supports 13,13 and positioned at intervals along the length of the conveyor system.

In accordance with this invention, a series of sensor circuits 14,14 are embedded in the conveyor belt 11 at spaced intervals along the length of the belt 11. The interval between adjacent sensor circuits 14,14 can vary, a distance between adjacent sensor circuits 14,14 ranging from 5 to 40 feet being a desirable spacing with a spacing between adjacent sensor circuits 14,14 of about 20 feet being preferred. The spacing between adjacent sensor circuits 14,14 need not be uniform along the length of the conveyor belt since the monitoring system of this invention does not depend upon the interruption of a pulsing signal at uniform intervals for triggering the alarm circuit.

Figure 5:
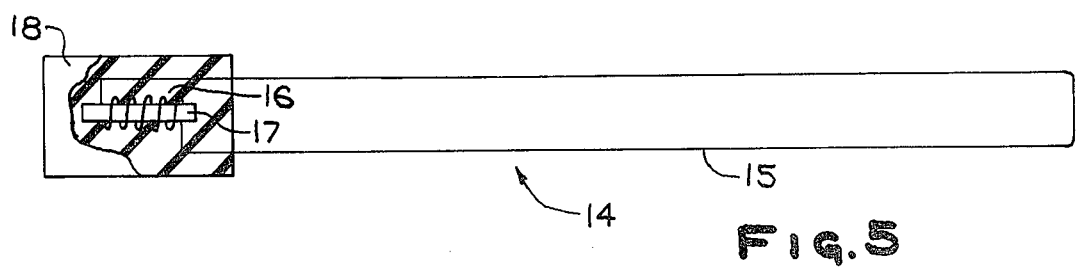
FIG. 5 is a schematic plan view, partly broken away, illustrating the sensor circuit employed in the preferred embodiment of this invention.

Each sensor circuit 14 consists of an open loop of conductive wire 15 that extends transversely across substantially the width of the conveyor belt 11 and an inductor coil 16 wound on a powder core 17 with the terminals of inductor coil 16 in electrical connection with the ends of the loop of conductive wire 15, as illustrated in FIG. 5. The inductor coil 16 and powder core 17 of the sensor circuit may be enclosed in a housing 18 to protect the inductor coil 16 and powder core 17 from damage. However, housing 18, if used, is not considered to constitute a component of the sensor circuit. Preferably, the sensor circuits 14,14 are positioned between the belt carcass and the cover on the inner periphery of the conveyor belt to remove them from being closely adjacent to the surface of the belt onto which the bulk material to be conveyed is charged.

The gauge of wire from which the loop of conductive wire 15 of the sensor circuit 14 is formed should be sufficiently smll so that a longitudinal rip in the conveyor belt 11 that extends through a sensor circuit 14 (such as the rip 19 depicted in FIG. 1) will cause the breakage of the loop of wire 15. The gauge of wire from which the loop of wire 15 of the sensor circuit is formed should not be so small, however, that the loop of wire 15 will be broken merely as a result of the conveyor belt 11 being fixed as it is advanced around the drive and idler rolls of the conveyor system. Desirably, a strand of wire is used. A No. 22 gauge strand of copper wire has been found to be satisfactory for use in forming the loops of wire 15,15 of the sensor circuits 14,14.

Figure 3:
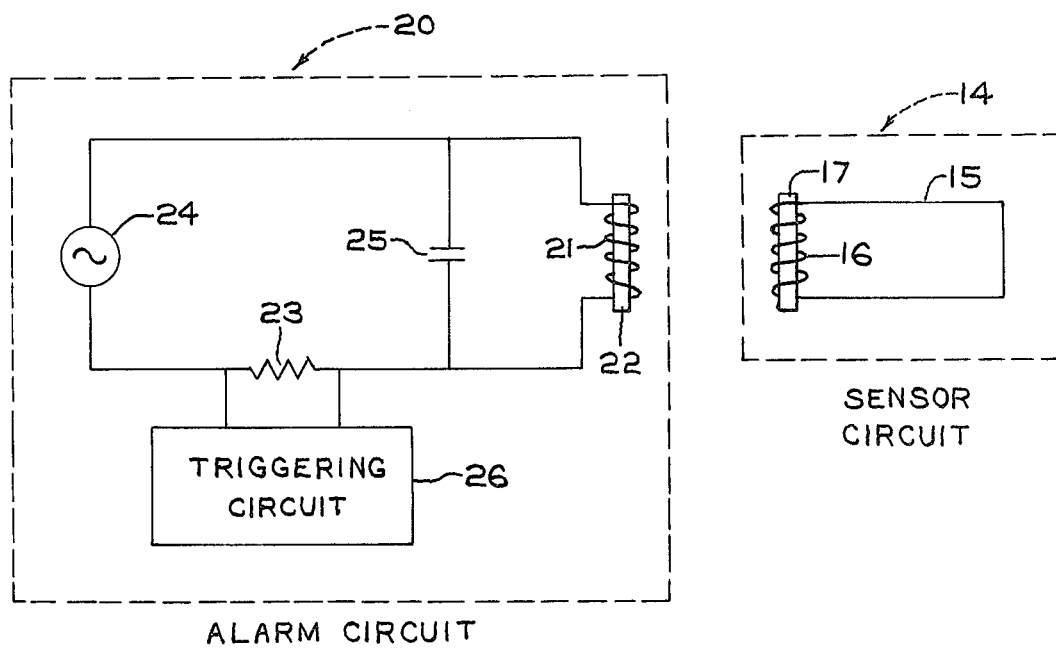
FIG. 3 is a block diagram illustrating the preferred embodiment of this invention.

As shown in FIG. 3, the alarm circuits 20,20 of the monitoring system each includes an inductor coil 21 wound on a powder core 22 and serially connected with resistor 23 and a generating source of constant frequency alternating current such as oscillator 24. A condenser 25 is connected across the terminals of inductor coil 21 and an alarm triggering circuit 26 (which may consist of the circuitry shown in FIG. 4 and which will be described below in greater detail) is connected across the terminals of resistor 23. The inductor coils 21,21 of the alarm circuits 20,20 are positioned adjacent to the edge of conveyor belt 11 and are located so that as the conveyor belt 11 is advanced the inductor coil 16 of each sensor circuit 14 passes sequentially in close proximity to the inductor coil 21 of each alarm circuit 20. The inductor coils 21,21 may be retained in fixed position by securing the inductor coil 21 to a bracket 27 which, in turn, is secured to an appropriately located support 13. Desirably, inductor coil 16 and inductor coil 21 will pass within two to three inches of each other as the sensor circuit 14 is advanced pass the alarm circuit 20.

Cores 17 and 22 around which inductor coils 16 and 21 respectively are wound may be made either of powdered ferromagnetic material or powdered ferrimagnetic material held together with a binder. An example of a powdered ferromagnetic material is pure carbonyl iron powder. The powdered ferrimagnetic materials from which powdered cores usually are made include powdered ferrites of the spinel, magnetoplumbite, or garnet types.

The circuit of each alarm circuit 20,20 that includes inductor coil 21, resistor 23 and condenser 25, the "primary circuit," is designed to be tuned to electrical resonance at the frequency of the signal generated by oscillator 24. The condition of resonance can be achieved by a proper selection of the inductor coil 21 and condenser 25. If a particular condenser 25 is selected for use in the "primary circuit," an inductor coil 21 will need to be selected that has the correct number of turns of wire in the coil that will produce the desired resonant condition at the frequency of the signal emitted by oscillator 24. The correct number of turns of wire which should be used in the conductor coil 21 can be determined by varying the number of turns of wire in the coil until the voltage across the coil is at a maximum (indicating that the circuit is in electrical resonance). The alarm circuits 20,20 should be designed so that the inductor coil 21 of each alarm circuit have the same construction.

Also, the circuit of each sensor circuit 14,14 that includes the inductor coil 16 and the wire loop 15, the "secondary circuit," is designed so that it exhibits electrical resonance at the frequency of the signal generated by oscillator 24 when the loop of wire 15 is broken (creating an "open circuit"). The desired condition of electrical resonance in the "secondary circuit" is achieved by the proper selection of the ratio of the number of turns of wire in inductor coil 16 to the number of turns of wire in inductor coil 21. In order to determine the number of turns of wire to be used in the inductor coil 16 to produce the desired condition of resonance in the sensor circuit, the number of turns of wire in the inductor coil 16 is varied and the voltage across inductor coil 16 measured for the varying number of turns of wire as inductor coil 16 is moved in close proximity to the inductor coil 21 of an alarm circuit 20 with the "secondary circuit" open (which condition is obtained by disconnecting one connection of the wire loop 15 with coil 16) until the number of turns of wire in inductor coil 16 that produces the greatest voltage across inductor coil 16 is determined. The number of turns of wire in coil 16 that produces the greatest voltage across coil 16 is the number of turns of wire that produces electrical resonance in the "secondary circuit" of the sensor circuit 14 at the frequency of the signal emitted by oscillator 24. Alternatively, with the "primary circuit" of an alarm circuit 20 tuned to resonance and the "secondary circuit" of the sensor circuit being tuned to resonance "open" the number of turns of wire in inductor coil 16 are varied and the voltage across condenser 25 of the alarm cicuit 20 measured (for each of the varying number of turns of wire in the coil 16) as the coil 16 passes in close proximity to coil 21 of the alarm circuit 20 until the voltage across the condenser 25 of the alarm circuit 20 reaches a minimum value (indicating that the "secondary circuit" is formed to resonance at the frequency of the signal being emitted by oscillator 24). The condition of electrical resonance in the "secondary circuit" of the sensor circuits 14,14 can be attributed to the "distributed capacitance" characteristic exhibited by the coil 16 in each sensor circuit. It will be understood that the components of each alarm circuit 20,20 should be identical to those used in the other alarm circuits 20,20 of the monitoring system and that each alarm circuit 20,20 be operated at the same frequency. Also, the components of each sensor circuit 14,14 should be indentical to those used in the other sensor circuits 14,14 of the monitoring system. When the "primary circuits" of the alarm circuits 20,20 all are tuned to resonance at the frequency of the signals generated by the respective oscillators 24,24 in the alarm circuits 20,20 and the "secondary circuits" of the sensor circuits 14,14 tuned to resonance at the same frequency, the "primary circuits" and the "secondary circuits" are considered to have "matched resonance" and the passing of the inductor coils 16,16 of the sensor circuits 14,14 in close proximity to the inductor coils 21,21 of the alarm circuits 20,20 will produce a noticeable change in voltage across inductor coils 21,21 only when the "secondary circuit" of a sensor circuit 14 is "open."

The frequency at which each alarm circuit 20,20 operates is determined by the frequency of the signal generated by the oscillator 24 in each alarm circuit. As indicated above, each alarm circuit 20,20 is designed to operate at the same frequency. Although the alarm circuits 20,20 can be designed to operate at relatively low frequencies, normally it is desirable that the alarm circuits 20,20 be designed to operate at a frequency above about 100 kilohertz.

Figure 6:
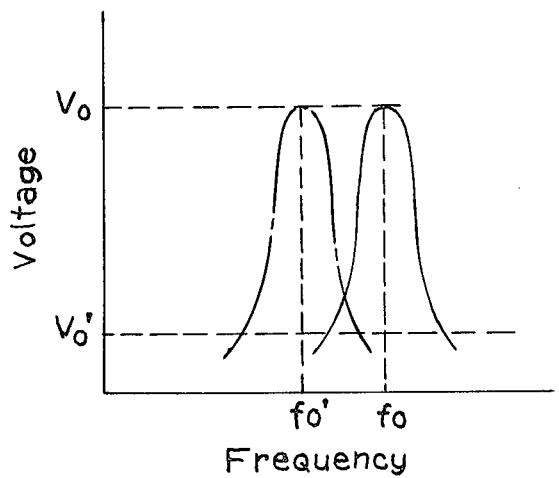
FIG. 6 illustrates the change in voltage amplitude across the inductor coil of the alarm circuit of the embodiment of this invention shown in FIG. 1 during the period that the inductor coil of a sensor circuit in which the loop wire has been broken passes in close proximity to the inductor coil of the alarm circuit as the conveyor belt is advanced.

During normal operation of the conveyor system 10, as the conveyor belt 11 advances the inductor coils 16,16 of the sensor circuits 14,14 are advanced and sequentially pass in close proximity to the inductor coils 21,21 of the alarm circuits 20,20 positioned at spaced intervals along the path of travel of the conveyor belt 11. As long as the circuit formed by the inductor coil 16 and wire loop 15 of a sensor circuit 14 is "closed," the passage of the sensor circuit 14 in close proximity to an inductor coil 21 of an alarm circuit 20 will have no noticeable effect on the alarm circuit 20 and the operation of the conveyor 10 will not be affected. However, if a longitudinal rip develops in conveyor belt 11 and becomes of such size as to cause the breaking of the loop of wire 15 of a sensor circuit 14 (as is illustrated schematically in FIG. 1), the circuit of such sensor circuit 14 will become "open" and the inductor coil 16 of such sensor circuit 14 then will be in resonance with its "distributed capacitance" and in "matched resonance" with the "primary circuit" of an alarm circuit 20 during the period that the inductor coil 16 of such sensor circuit 14 passes in close proximity to the inductor coil 21 of the alarm circuit 14. As a consequence of the inductor coil 16 of such sensor circuit 14 being in "matched resonance" with the "primary circuit" of an alarm circuit 20 during the time interval that the conductor 16 of such sensor circuit 14 passes in close proxmity to the inductor coil 21 of the alarm circuit 14, the resonance frequency of the "primary circuit" of the alarm circuit 14 changes during the period when the coil 16 is passing in close proximity to coil 21. The aforementioned change of resonant frequency of the "primary circuit" of the alarm circuit 20 from frequency $f_o$ to frequency $f_o'$ and the resulting drop in voltage amplitude across the inductor coil 21 of the affected alarm circuit from $V_o$ to $V_o'$ is illustrated in FIG. 6. As is indicated by the resonance curves in FIG. 6, when the electrical circuit of the sensor circuit 14 is "closed," the voltage across inductor coil 21 of the alarm circuit 20 with the "primary circuit" of the alarm circuit 20 in resonance at frequency $f_o$ is at maximum voltage amplitude $V_o$ (shown by the solid line curve). However, a longitudinal rip causes the breaking of the loop of wire 15 in a sensor circuit 14 causing the electrical circuit of the sensor circuit 14 to become "open," the resonant frequency of the "primary circuit" of the alarm circuit 20 is changed to the new resonant frequency $f_o'$ during the period that the inductor coil 16 of the sensor circuit having the broken loop of wire 15 passes in close proximity to the inductor coil 21 of the alarm circuit (shown by the dot and dash line curve). The frequency of the signal being emitted by the oscillator 24 of the alarm circuit has not changed, however, and remains at $f_o$ and, as illustrated in FIG. 6, the voltage across the inductor coil 21 of the alarm circuit 20 drops to voltage amplitude $V_o'$. The drop in voltage across coil 21 (from $V_o$ to $V_o'$) during the period that the inductor coil 16 of the sensor circuit 14 with the broken wire loop 15 passes in close proximity to the inductor coil 21 of an alarm circuit 20 is "noticed" by the triggering circuit 26 of the alarm circuit and produces a warning signal or shuts down the conveyor system or both.

Figure 4:
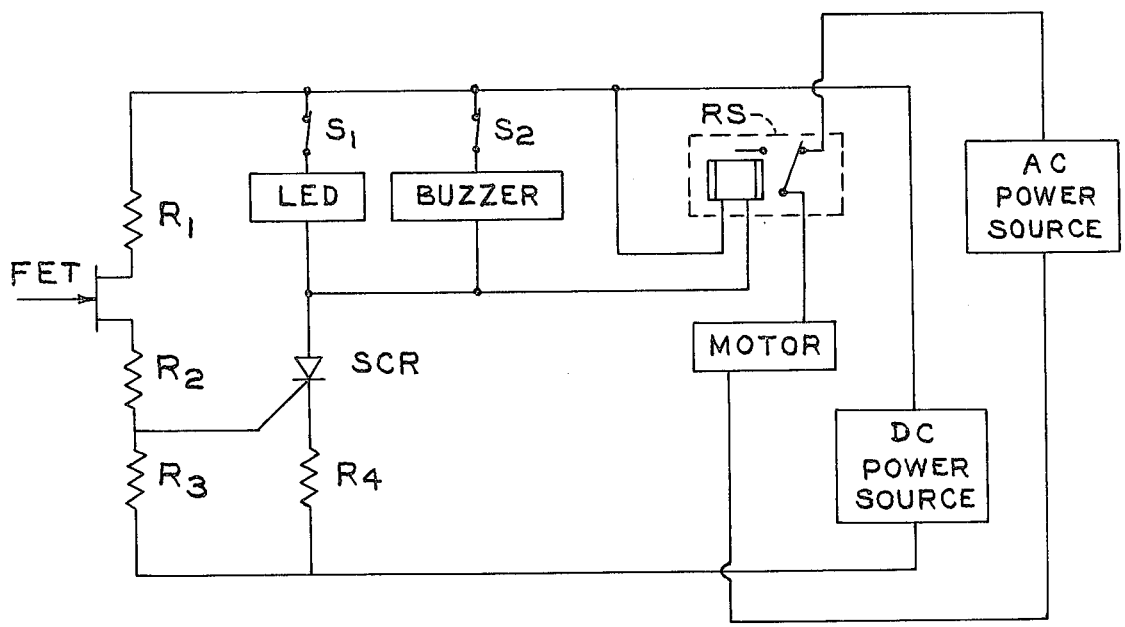
FIG. 4 shows a circuit diagram illustrating a triggering circuit which may be used with the embodiment of this invention shown in FIG. 3.

The triggering circuit 26 may be any circuitry responsive to a variation in voltage. One such triggering circuit is illustrated in FIG. 4 and is composed of a field effect transistor (FET), resistors $R_1$, $R_2$, $R_3$ and $R_4$, a silicon controlled rectifier (SCR), a light emitting diode (LED), a buzzer, switches $S_1$ and $S_2$, a relay switch (RS) and a DC power source. As described above, when there are no broken sensor circuits 14,14, the voltage across resistor 23 of the alarm circuit is of small magnitude and insufficient to produce a signal of large enough magnitude to trigger the SCR. However, when a longitudinal rip occurs in the conveyor belt 11 and causes the breaking of a wire loop 15 of a sensor circuit 14, the voltage across resistor 23 increases sufficiently (because of the drop in voltage across coil 21 of the alarm circuit) during the period that inductor coil 16 of the open-circuited sensor circuit 14 passes in close proximity to the inductor coil 21 of an alarm circuit 20 as the conveyor belt 11 advances to cause a signal of sufficient magnitude to be produced to trigger the SCR. The buzzer and LED then produce audible aid visual warning signals indicating the damaged condition of the conveyor belt, which signals will continue until switches $S_1$ and $S_2$ are manually "opened." The triggering of the SCR also energizes relay switch RS and breaks the circuit that includes the motor for driving the conveyor system 10 thereby "shutting down" the conveyor system 10 before further damage to the system occurs.

As is evident from the foregoing description of an embodiment of this invention, the "primary circuit" of each alarm circuit of the monitoring system is designed to be tuned to electrical resonance at the frequency at which the alarm circuits operate. Also, the ratio of turns of wire in the inductor coil of each sensor circuit of the monitoring system to the number of turns of wire in the inductor coils of th alarm circuits is selected so that the "secondary circuit" of the sensor circuits when the wire loop of the sensor circuit is broken will be in electrical resonance at the frequency at which the alarm circuits of the monitoring system operate during the time that the inductor coil of such sensor circuit (with a broken wire loop) passes in close proximity to an inductor coil of an alarm circuit of the monitoring system as the conveyor belt is advanced. The sensor circuits of the monitorng system are devoid of condenser components, but, instead, depend upon the "distributed capacitance" characteristic of the inductor coil in each sensor circuit when circuit is open (as a result of the breaking of the loop of wire in the circuit) to provide the desired resonant condition in the circuit.

Although the preferred embodiment of the invention employs a series of alarm circuits 20,20 spaced at intervals along the path of advance of the conveyor belt, a single alarm circuit 20 may be used, if desired. If only a single alarm circuit 20 is employed, desirably it is located at a position along the path of advance of the conveyor belt which monitors the conveyor belt soon after material to be conveyed is charged onto the belt.

I claim:

1. A monitoring system for detecting the presence of longitudinal rips in a conveyor belt, said monitoring system comprising an endless flexible conveyor belt, a series of sensor circuits embedded in said conveyor belt and spaced relative to each other at intervals along the length of said conveyor belt, each said sensor circuit consisting of an open loop of conductive wire that has terminal ends and that extends transversely across substantially the width of said conveyor belt and an inductor coil means that has terminal ends and that is wound on a powder core, the terminal ends of said inductor coil means in each said sensor circuit being in electrial connection with the terminal ends of said loop of conductive wire of the sensor circuit, at least one alarm circuit positioned adjacent to the path of advance of said conveyor belt, said alarm circuit including in electrical connection an inductor coil means wound on a powder core, capacitance means, resistor means, oscillator means for generating an alternating signal of constant frequency and a triggering circuit responsive to a change in the voltage across said inductor coil means of the alarm circuit, said inductor coil means of said alarm circuit being positioned in close proximity to said conveyor belt at a location so that the inductor coil means of each said sensor circuit will pass in close proximity to the inductor coil means of said alarm circuit as the said conveyor belt is advanced, said inductor coil means of said alarm circuit and the said capacitance means in electrical connection therewith being in a "primary circuit" that is in electrical resonance at the frequency of the signal generated by said oscillator means in said alarm circuit, said inductor coil means of each said sensor circuit containing a number of turns of wire in the coil to cause the said inductor coil means to be in electrical resonance with its distributed capacitance at the frequency of the said signal generated by said oscillator means within the said alarm circuit with the circuit of the sensor circuit open and during the time the said inductor coil means of the open sensor circuit passes in close proximity to said inductor coil means of said alarm circuit.

2. A monitoring system according to claim 1 wherein said system includes a series of said alarm circuits spaced at intervals along the path of advance of said conveyor belt and wherein said oscillator means of each said alarm circuit is structured to emit a signal of essentially the same frequency during the operation of the said monitoring system.

3. A monitoring system according to claim 2 wherein said inductor coil means of said sensor circuits and said inductor coil means of said alarm circuits are wound on cores comprised of powdered ferromagnetic material.

4. A monitoring system according to claim 2 wherein said inductor coil means of said sensor circuits and said inductor coil means of said alarm circuits are wound on cores comprised of powdered ferrimagnetic material.

* * * * *